United States Patent [19]

Watanabe

[11] Patent Number: 5,154,983
[45] Date of Patent: Oct. 13, 1992

[54] MAGNETIC ALLOY

[75] Inventor: Yasushi Watanabe, Yokosuka, Japan

[73] Assignee: Victor Company of Japan, Ltd., Yokohama, Japan

[21] Appl. No.: 598,515

[22] Filed: Oct. 16, 1990

[30] Foreign Application Priority Data

| Oct. 18, 1989 | [JP] | Japan | 1-271009 |
| Feb. 16, 1990 | [JP] | Japan | 2-35762 |
| Feb. 19, 1990 | [JP] | Japan | 2-37822 |
| Mar. 20, 1990 | [JP] | Japan | 2-71286 |
| Jul. 6, 1990 | [JP] | Japan | 2-179177 |

[51] Int. Cl.⁵ .................. C22C 38/00; H01F 10/12
[52] U.S. Cl. .................. 428/611; 148/306; 148/310; 148/311; 428/694
[58] Field of Search ............... 148/300, 306, 307, 308, 148/309, 310, 311; 428/611, 694

[56] References Cited

FOREIGN PATENT DOCUMENTS 159027 10/1985 European Pat. Off. ............ 148/309
286124 10/1988 European Pat. Off. ............ 148/306
288316 10/1988 European Pat. Off. ............ 148/306

Primary Examiner—George Wyszomierski
Attorney, Agent, or Firm—Lowe, Price, LeBlanc & Becker

[57] ABSTRACT

A magnetic alloy represented by the compositional formula:

$$Fe_xN_yM_z$$

wherein M represents at least one of the elements B, C, Al, Ga, or Ge, or M is $M'_zL_v$ wherein M' has the same definition as the above M and L represents at least one selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y and z or x, y, z and v have the following relationship: $1 \leq y \leq 20$, $0.5 \leq z \leq 15$ and $x+y+=100$ or $1 \leq y \leq 20$, $0.5 \leq z \leq 15$, $0.3 \leq v \leq 15$ and $x+y+z+v=100$, respectively, in atom %.

5 Claims, 7 Drawing Sheets

MAGNETIC ALLOY

BACKGROUND OF THE INVENTION

1. Field of the Invention

This invention relates to a magnetic alloy suitable for a magnetic head used for high-density magnetic recording.

2. Description of the Prior Art

With a recent increase in demands for achieving higher-density or broader-frequency band magnetic recording, it has been attempted to use in a magnetic recording medium a magnetic material having a high coercive force to narrow the width of recording tracks so that high-density magnetic recording-reproducing can be achieved. Magnetic alloys having a high saturation magnetic flux density Bs are needed as materials for magnetic heads used in carrying out the recording-reproducing on such a magnetic recording medium having a high coercive force. Under such circumstances, magnetic heads comprised of, in part or as a whole, a sendust alloy or a Co-Zr amorphous alloy or the like are proposed.

With a more increasing tendency toward higher coercive force of magnetic recording mediums, however, it has become difficult for the magnetic heads comprised of the sendust alloy or Co-Zr amorphous alloy to attain good magnetic recording-reproducing. A perpendicular magnetic recording system is also proposed, in which a magnetic recording medium is magnetized not in its longitudinal direction but in its thickness direction. In order to successfully carry out this perpendicular magnetic recording system, the tip of the main magnetic pole of a magnetic head must be made to have a thickness of not more than 0.5 μm, so that it becomes necessary to use a magnetic alloy used for magnetic heads that has a high saturation magnetic flux density, even when recording is carried out on a magnetic recording medium having a relatively low coercive force.

Under such circumstances, magnetic alloys mainly composed of iron, as exemplified by alloys of an iron nitride or Fe-Si system, are known as magnetic alloys having a higher saturation magnetic flux density than the sendust alloys or Co-Zr amorphous alloys.

These conventionally well known magnetic alloys with a high saturation magnetic flux density Bs, however, has so large a coercive force Hc that they are unsatisfactory as materials for magnetic heads when used as they are. Hence, a magnetic head with a multilayer structure is proposed in which a magnetic material with a low coercive force such as a sendust alloy or a permalloy, or a nonmagnetic material such as $SiO_2$, is used to form an intermediate layer.

In order to give a magnetic head having such a multilayer structure, there are problems that manufacturing steps or cost must be increased and also it is difficult to maintain reliability. In particular, to give a film thickness of several microns or more, it is sometimes required to provide a multi-layer structure of 100 layers or more. There is also a limit to the working range.

For the purpose of solving this problem, the present inventor has proposed that a magnetic alloy with a single layer and a high Bs and low Hc can be obtained using an Fe-N-O alloy. This alloy, however, has the problem that it is not suitable for glass molding.

SUMMARY OF THE INVENTION

Accordingly, an object of the present invention is to provide a magnetic alloy that has a high saturation magnetic flux density and a small coercive force and also has a superior thermal stability even if it has not multilayer structure.

The present invention was made in order to solve the above problems.

Stated summarily, the present invention provides a magnetic alloy represented by the compositional formula:

ti $Fe_xN_yM_z$ 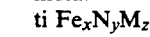

wherein M represents at least one of the elements belonging to Group IIIA and Group IVA of the periodic table, or M is $M'_zL_v$ wherein M' has the same definition as the above M and L represents at least one selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y and z or x, y, z and v have the following relationship:

$1 \leq y \leq 20$
$0.5 \leq z \leq 15$
$x + y + z = 100$ or $1 \leq y \leq 20$
$0.5 \leq z \leq 15$
$0.3 \leq v \leq 15$
$x + y + z + v = 100$ respectively, in atom %.

Preferred embodiments of the above magnetic alloy will become apparent from what are herein set out later.

The present invention also provides a magnetic alloy film represented by the compositional formula:

$Fe_xN_yM_z$ 

wherein M represents at least one elements selected from the group consisting of metals other than Fe, and semimetals; x, y and z have the following relationship:

$1 \leq y \leq 10$
$0.5 \leq z \leq 10$
$x + y + z = 100$;

and the plane of said film is oriented to have the (110) plane of α-Fe, or oriented to have the (110) plane of α-Fe and the (200) plane of γ'-Fe₄N and the relative intensity of X-ray diffraction for the 110) plane of α-Fe is greater than the relative intensity of X-ray diffraction for the (200) plane of γ'-Fe₄N.

The magnetic alloy or the magnetic alloy film according to the present invention has a high saturation magnetic flux density, has a low coercive force, has a high permeability and has a superior thermal resistance and corrosive resistance, and is useful as a magnetic alloy or magnetic alloy film for magnetic devices such as magnetic heads. Thus, use of the magnetic alloy or magnetic alloy film of the present invention makes it possible to carry out good recording-reproducing on a magnetic recording medium having a high coercive force, and also makes it possible to produce a thin film magnetic head having a high performance and hence to achieve high-density recording-reproducing.

DESCRIPTION OF THE PREFERRED EMBODIMENTS

In a first embodiment, the present invention is a magnetic alloy represented by the compositional formula:

$Fe_xN_ySi_z$ wherein x, y and z have the following relationship:

$1 \leq y \leq 20$
$0.5 \leq z \leq 15$
$x+y+z=100$ in atom %, or a magnetic alloy represented by the compositional formula:

$Fe_xN_ySi_zL_v$ wherein L represents Cr or Ru, or a mixture of Cr and Ru; and x, y, z and v have the following relationship:

$1 \leq y \leq 20$
$0.5 \leq z \leq 15$
$0.3 \leq v \leq 15$
$x+y+z+v=100$ in atom %.

The magnetic alloy according to the first embodiment of the present invention can be prepared in the following way.

Figure 1:
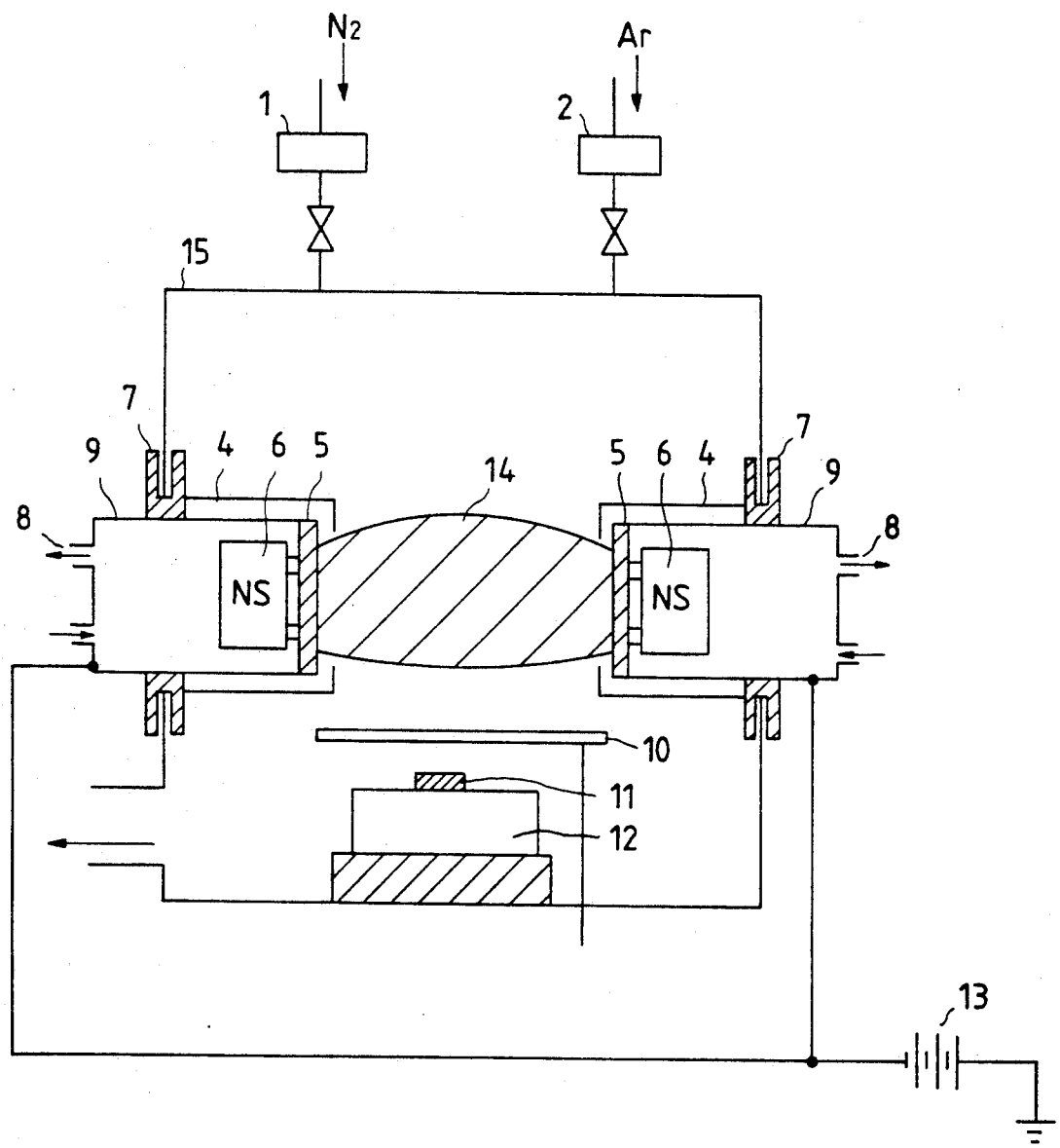
FIG. 1 is a schematic illustration of a sputtering apparatus which is an example for an apparatus for preparing the magnetic alloy according to the present invention.

FIG. 1 shows an example of an apparatus (a sputtering apparatus) for preparing the magnetic alloy according to the first embodiment of the present invention.

A pair of targets 5 are alloy targets each composed of iron (Fe) and silicon (Si), or composite targets each comprised of a pure-iron target provided with an appropriate recession and a tip-shaped Si embedded in the recession. These targets 5 are respectively supported with target holders 9. Minus potential is applied to the targets 5 and the target holders 9 from a direct current electric source 13. Shields 4 are fitted to the surroundings of the target holders 9. Magnets for focusing plasma 14 at the region between the both targets 5 and 5 are respectively inserted in the insides of the target holders 9. Cooling water is flowed in and through the target holders to prevent the surfaces of the targets from overheat. At the right and left sides of a vacuum chamber 15 grounded, the two target holder 9 are respectively provided in an insulated state through insulators 7.

From the top of this vacuum chamber 15, nitrogen (N₂) and argon (Ar) are fed at given flow rates controlled by flowmeters 1 and 2, respectively.

The argon is used for the purpose of sputtering the targets and at the same time controlling the quantity of nitrogen in a magnetic alloy film to be formed.

At the bottom of the vacuum chamber 15, a substrate 11 is placed on a substrate holder 12. The substrate 11 is covered with a shutter 10 so that inclusion of impurities can be prevented.

In the sputtering apparatus as described above, the direct current electric source is turned on to generate the plasma 14 between the targets 5 and 5 respectively supported with the both target holders 9. As a result, since the targets have minus potential, argon ions (Ar+) in the plasma 14 bombard the targets 5, and thus iron atoms and Si atoms in the targets 5 are broken away therefrom. Then, the iron atoms and Si atoms broken away from the targets 5 and the atoms or molecules of nitrogen in the plasma combine to deposit on the substrate 11 and grow into an alloy film.

For several minutes after the sputtering is started, the shutter 10 is closed to cover the substrate 11 so that some impurities on the surface of the targets 5 may not adhere to the substrate 11. The shutter 10 is thereafter opened.

The flow rates of the nitrogen and argon are controlled by the flowmeters 1 and 2, respectively. The $Fe_xN_ySi_z$ alloy according to the first embodiment of the present invention, containing the nitrogen in a given quantity, can be thus obtained.

Table 1 shows the relationship between the content of nitrogen and Si in the $Fe_xN_ySi_z$ alloy thus obtained and the saturation magnetic flux density Bs and coercive force Hc thereof.

TABLE 1

| Sample No. | N (at %) | Si (at %) | Fe | Bs (kG) | Hc (Oe) |
|---|---|---|---|---|---|
| 1 | 5.6 | — | bal. | 18.5 | 1.2 |
| 2 | — | 1.5 | bal. | 19 | 8.0 |
| 3 | 1.0 | 6.0 | bal. | 17 | 0.8 |
| 4 | 2.5 | 1.8 | bal. | 18.5 | 0.6 |
| 5 | 10 | 0.5 | bal. | 16 | 0.8 |
| 6 | 19.6 | 1.5 | bal. | 10 | 1.1 |
| 7 | 3.2 | 15 | bal. | 10 | 1.1 |

In Table 1, which shows the relationship between the content of nitrogen and Si and the saturation magnetic flux density Bs and coercive force Hc, the content is expressed in terms of atom % according to a quantitative analysis carried out by ESCA (X-ray electron spectroscopy for chemical analysis) or EPMA (X-ray electron probe microanalysis). Errors of about ±20 % are estimated. The coercive force is expressed by a value obtained when a heat treatment is carried out in vacuum. The heat treatment is herein carried out at 300° C. Of these data, Sample No. 1 shows a result obtained when nitrogen only has been incorporated into Fe. Sample No. 2 shows a result obtained when Si only has been incorporated into Fe. Samples Nos. 3 to 7 are magnetic alloys according to the first embodiment of the present invention.

A nitrogen content of less than 1 atom % can bring about no remarkable effect attributable to nitrogen, resulting in little decrease of Hc. On the other hand, a nitrogen content more than 20 atom % may result in a serious lowering of Bs to make it impossible to achieve a high Bs. Thus, a magnetic alloy with a high Bs and low Hc can be obtained when the nitrogen is contained in an amount of from 1 to 20 atom %, and preferably from 1 to 10 atom %. The nitrogen content in the range of from 1 to 10 atom % makes it possible to obtain a magnetic alloy having not less than 15 kG of Bs and less than 1 Oe of Hc, as is evident from Table 1.

Figure 2:
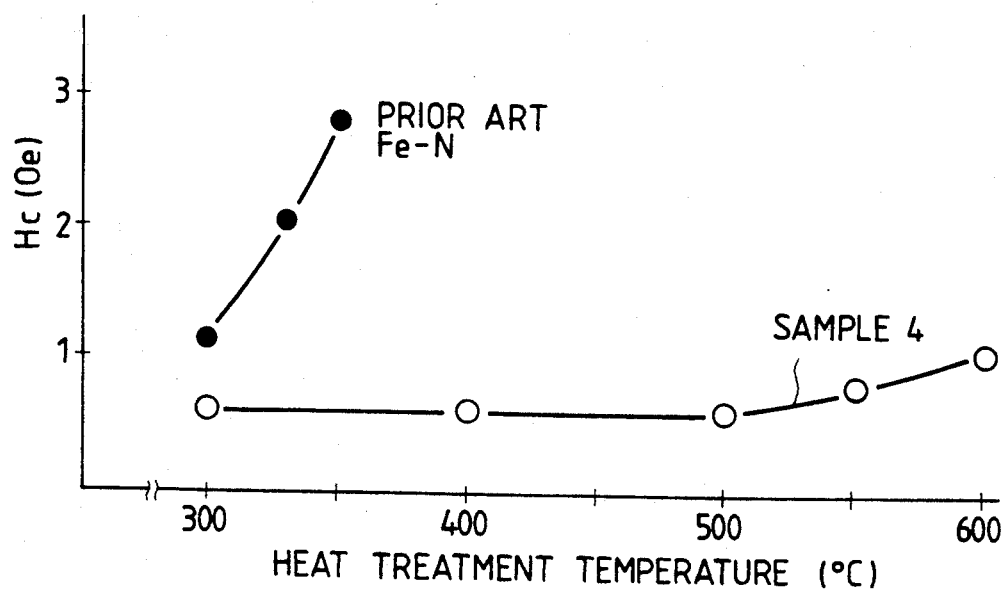
FIGS. 2, 5, 8 and 10 are each a graph to show changes of Hc depending on heat treatment temperatures in a prior art sample and a sample according to the present invention.

FIG. 2 shows changes of coercive force Hc depending on heat treatment temperatures in a magnetic alloy according to the first embodiment of the present invention and a conventional iron nitride (FeN) alloy. The FeN alloy has a relatively low Hc when the heat treatment temperature is 300° C. The Hc, however, abruptly increases when it is higher than 300° C. On the other hand, the $Fe_xN_ySi_z$ magnetic alloy according to the first embodiment of the present invention is seen to have a low Hc and has a superior thermal stability. Here, an Si content less than 0.5 atom % can bring about no remarkable effect for achieving a low Hc and improving thermal stability, and an Si content more than 15 atom % may result in a serious lowering of Bs. Thus, a magnetic alloy with a high Bs and low Hc can be obtained when the Si is contained in an amount of from 0.5 to 15 atom %, and preferably from 0.5 to 6 atom %. The Si content in the range of from 0.5 to 6 atom % makes it possible to obtain a magnetic alloy having not less than 15 kG of Bs, as is evident from Table 1.

Figure 3:
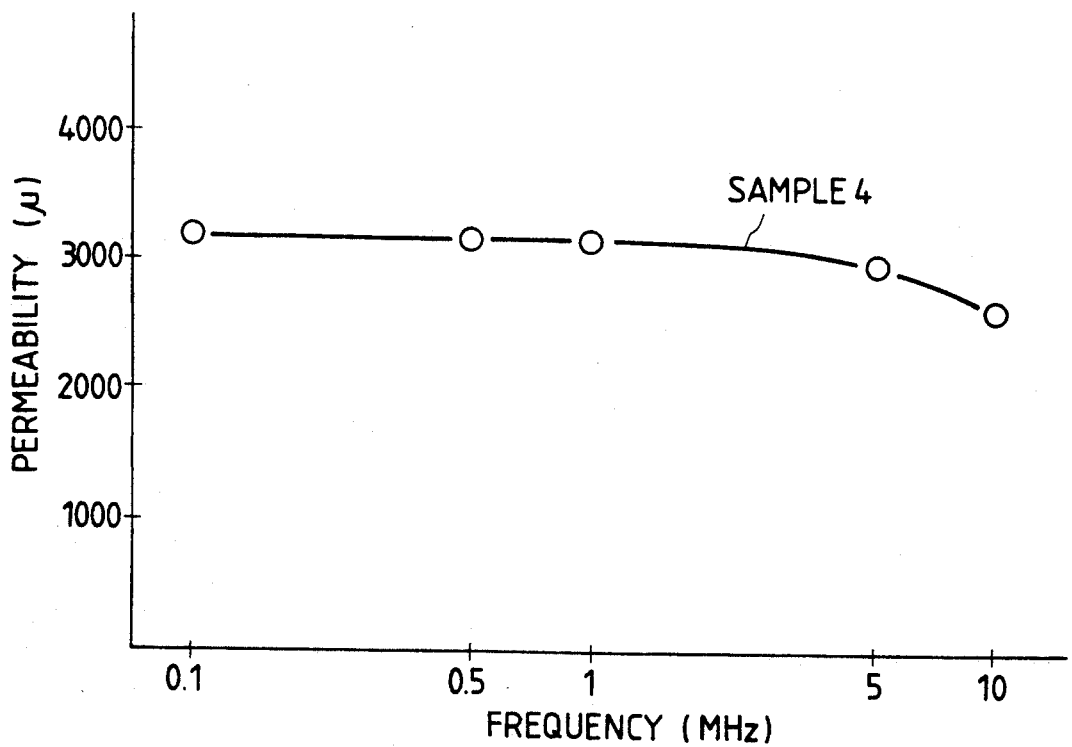
FIGS. 3, 6, 9 and 11 are each a graph to show a relationship between permeability μ and frequency of a sample according to the present invention.

FIG. 3 shows a relationship between permeability $\mu$ and frequency of the magnetic alloy according to the first embodiment of the present invention, when the alloy is formed with a film thickness of 2 $\mu$m. The magnetic alloy according to the present embodiment is seen to have a permeability of as high as 3,000 or more and be achievable of sufficient reproducing efficiency when used as a magnetic head.

Figure 4:
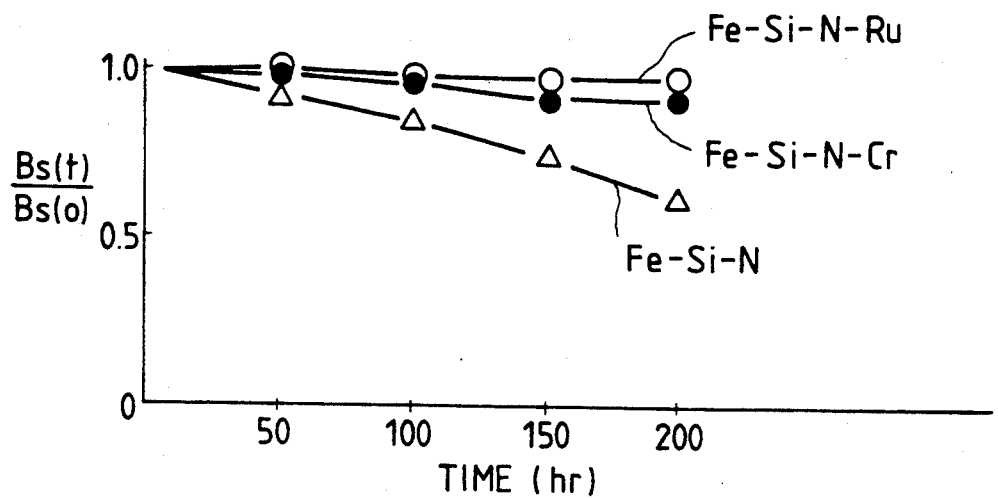
FIG. 4 is a graph to show how Ru and Cr contribute the improvement in corrosion resistance in the first embodiment of the present invention.

FIG. 4 shows that Ru and Cr contribute the improvement in corrosion resistance. In an experiment, samples were immersed in a 2 wt. % saline solution. Thereafter, they were taken out and left to stand in a high-temperature and high-humidity environment of 60° C. and 90% RH. The numbers on the abscissa indicate the time for which samples were left to stand and those on the ordinate indicate the proportion of the Bs before immersion in the saline solution, i.e., {Bs(O)}, to the Bs after samples were left to stand, i.e., {(t)}. Here, a content of Ru or Cr or a total content of Ru and Cr which is less than 0.3 atom % can bring about no remarkable effect of Ru and/or Cr on corrosion resistance, and a content or total content thereof which is more that 3 atom % may result in a deterioration of magnetic characteristics. Thus, the content of Ru or Cr or the total content of Ru and Cr should be in the range of from 0.3 to 3 atom %.

In a second embodiment, the present invention is a magnetic alloy represented by the compositional formula:

wherein M represent at least one of the elements belonging to Group IIIA of the periodic table; and x, y and z have the following relationship:

$1 \leq y \leq 10$
$0.5 \leq z \leq 10$
$x+y+z=100$ in atom %, or a magnetic alloy represented by the compositional formula:

wherein M represents at least one of the elements belonging to Group IIIA of the periodic table; L represents at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y, z and v have the following relationship:

$1 \leq y \leq 10$
$0.5 \leq z \leq 10$
$0.3 \leq v \leq 10$
$x+y+z=100$ in atom %.

The magnetic alloy according to the second embodiment of the present invention can be prepared using the same apparatus as shown in FIG. 1 and in the same way as in the magnetic alloy according to the first embodiment of the present invention, except that a pair of targets 5 are alloy targets each composed of iron (Fe) and Al, Ga or the like, or composite targets each comprised of a pureiron target provided with an appropriate recession and a tip-shaped Al, Ga or the like embedded in the recession.

Upon actuation of the apparatus, argon ions (Ar+) in the plasma 14 bombard the targets 5, and thus iron atoms and Al, Ga or the like atoms in the targets 5 are broken away therefrom. Then, the iron atoms and Al, Ga or the like atoms broken away from the targets 5 and the atoms or molecules of nitrogen in the plasma combine to deposit on the substrate 11 and grow into an alloy film.

The shutter 10 is similarly operated.

The flow rates of the nitrogen and argon are controlled by the flowmeters 1 and 2, respectively. The $Fe_xN_yM_z$ alloy or $Fe_xN_yM_zL_v$ alloy according to the second embodiment of the present invention, containing the nitrogen in a given quantity, can be thus obtained.

Table 2 shows the relationship between the content of nitrogen and Al, Ga or the like in the $Fe_xN_yM_z$ alloy thus obtained and the saturation magnetic flux density Bs and coercive force Hc thereof.

TABLE 2

| Sample No. | N (at %) | Al (at %) | Ga (at %) | B (at %) | Fe | Bs (kG) | Hc (Oe) |
|---|---|---|---|---|---|---|---|
| 1 | 5.6 | — | — | — | bal. | 18.5 | 1.2 |
| 2 | — | 2.0 | — | — | bal. | 20.0 | 7.0 |
| 3 | 1.0 | 4.0 | — | — | bal. | 18.5 | 1.0 |
| 4 | 5.5 | 2.2 | — | — | bal. | 18 | 0.5 |
| 5 | 4.8 | 0.5 | — | — | bal. | 19 | 1.0 |
| 6 | 5.3 | — | 4.0 | — | bal. | 17 | 0.4 |
| 7 | 5.0 | 6.0 | — | — | bal. | 16.5 | 0.3 |
| 8 | 5.8 | 2.0 | 1.5 | 0.5 | bal. | 17 | 0.5 |

In Table 2, which shows the relationship between the content of nitrogen and Al, Ga and so forth and the saturation magnetic flux density Bs and coercive force Hc, the content is expressed in terms of atom % according to a quantitative analysis carried out by ESCA (X-ray electron spectroscopy for chemical analysis) or EPMA (X-ray electron probe microanalysis). Errors of about ±20% are estimated. The coercive force is expressed by a value obtained when a heat treatment is carried out in vacuum. The heat treatment is herein carried out at 300° C. Of these data, Sample No. 1 shows a result obtained when nitrogen only has been incorporated into Fe. Sample No. 2 shows a result obtained when Al only has been incorporated into Fe. Samples Nos. 3 to 8 are magnetic alloys according to the second embodiment of the present invention.

Figure 7:
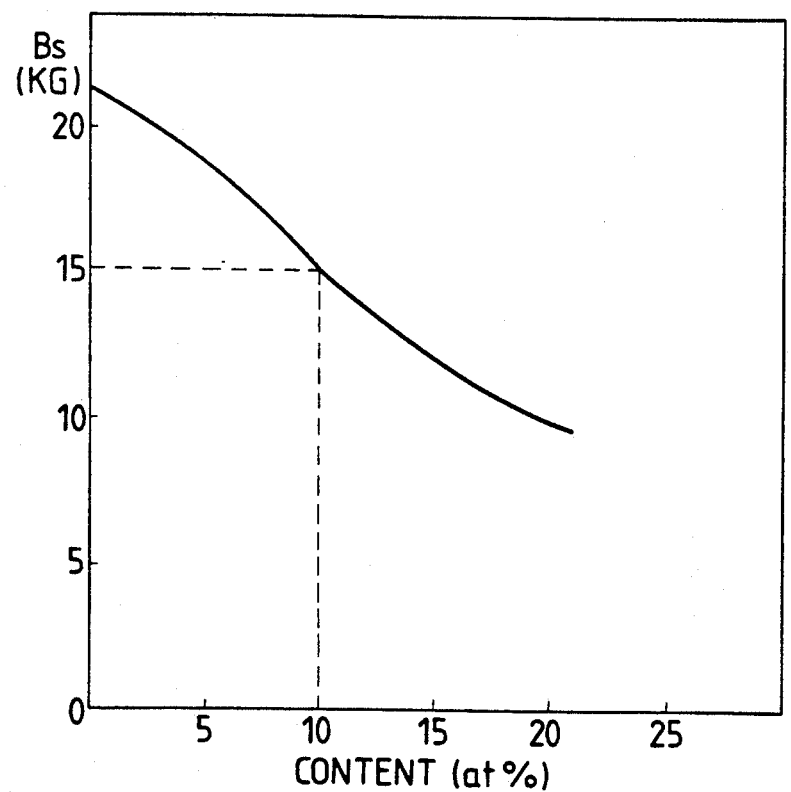
FIG. 7 is a graph showing the relationship of nitrogen content and magnetic flux density Bs(KG).

A nitrogen content of less than 1 atom % can bring about no remarkable effect attributable to nitrogen, resulting in little decrease of Hc. On the other hand, as shown in FIG. 7, Bs becomes 15 kG or more when the nitrogen content is not more than 10 atom %. Thus, a magnetic alloy with a high Bs and low Hc can be obtained when the nitrogen is contained in an amount of from 1 to 10 atom %.

Figure 5:
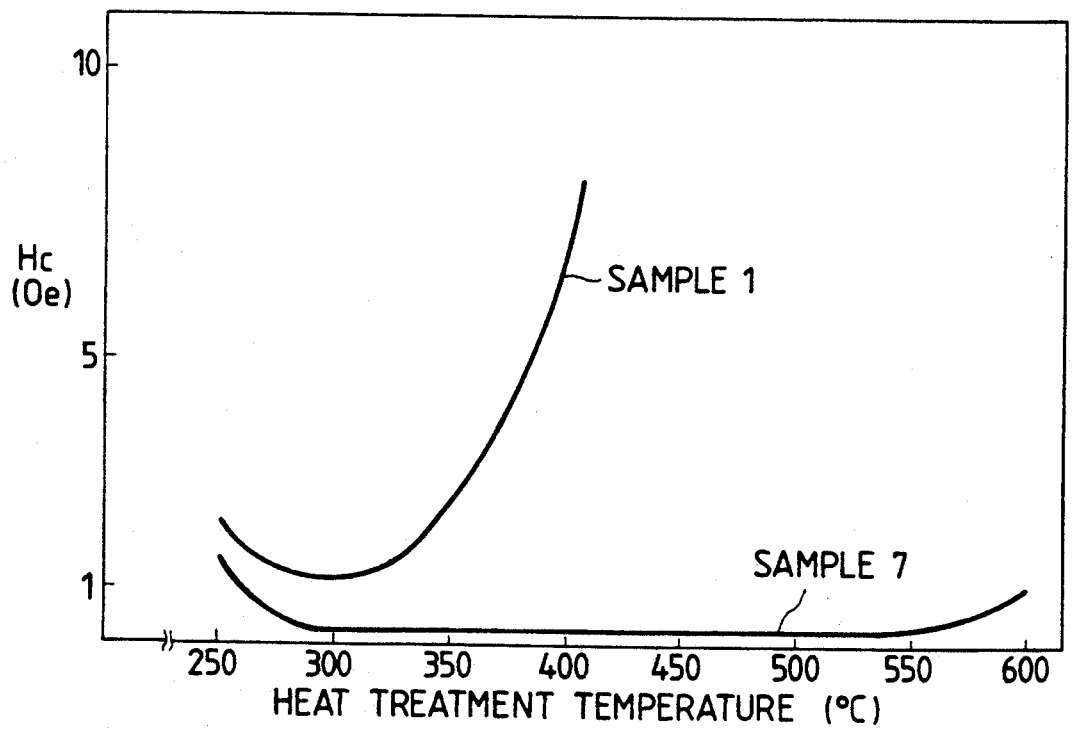

FIG. 5 shows changes of coercive force Hc depending on heat treatment temperatures in a magnetic alloy according to the second embodiment of the present invention and a conventional iron nitride (FeN) alloy. The FeN alloy has a relatively low Hc when the heat treatment temperature is 300° C. The Hc, however, abruptly increases when it is higher than 300° C. On the other hand, the magnetic alloy according to the second embodiment of the present invention is seen to have a low Hc and has a superior thermal stability. Here, a content of Al, Ga or the like or a total content of Al, Ga and so forth which is less than 0.5 atom % can bring about no remarkable effect for achieving a low Hc and improving thermal stability, and a content of Al, Ga or the like or a total content of Al, Ga and so forth which is more than 10 atom % may result in no formation of magnetic alloys having 15 kG or more of Bs. Thus, a magnetic ally with a high Bs and low Hc can be obtained when the content of Al, Ga or the like or the total content of Al, Ga and so forth is contained in an amount of from 0.5 to 10 atom %.

Figure 6:
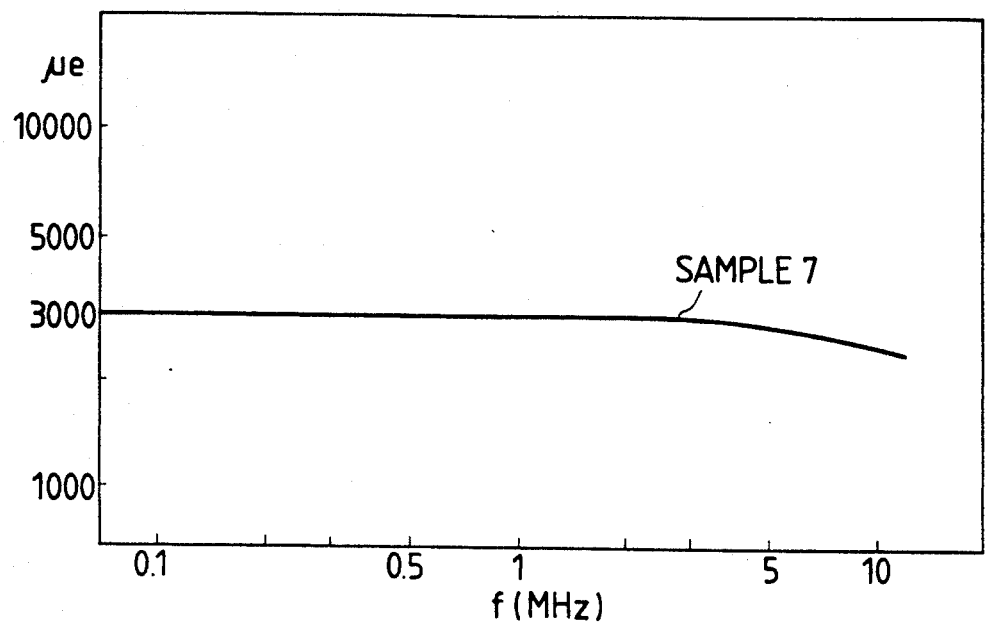

FIG. 6 shows a relationship between permeability $\mu$ and frequency of the magnetic alloy according to the second embodiment of the present invention, when the alloy is formed with a film thickness of 2 $\mu$m. The magnetic alloy according to the present embodiment is seen to have a permeability of as high as 3,000 end be achievable of sufficient reproducing efficiency when used as a magnetic head.

TABLE 3

| Sample No. | Element added | Amount (at %) | Corrosion resistance |
|---|---|---|---|
| 21 | — | — | poor |
| 22 | — | — | good |
| 23 | Ti | 0.3 | good |
| 24 | V | 3.0 | good |
| 25 | Cr | 0.3 | good |
| 26 | Co | 2.0 | good |
| 27 | Ni | 2.5 | good |
| 28 | Cu | 2.0 | good |
| 29 | Y | 3.0 | good |
| 30 | Zr | 3.0 | good |
| 31 | Nb | 2.5 | good |
| 32 | Mo | 0.5 | good |
| 33 | Ru | 1.0 | good |
| 34 | Rh | 1.0 | good |
| 35 | Pd | 3.0 | good |
| 36 | Ag | 3.0 | good |
| 37 | Sn | 2.0 | good |
| 38 | Sb | 2.0 | good |
| 39 | Hf | 3.0 | good |
| 40 | Ta | 3.0 | good |
| 41 | W | 1.0 | good |
| 42 | Re | 0.5 | good |
| 43 | Os | 2.0 | good |
| 44 | Ir | 2.0 | good |
| 45 | Pt | 3.0 | good |
| 46 | Au | 3.0 | good |
| 47 | Pb | 2.0 | good |

Table 3 shows that elements such as Ti and Cr contribute the improvement in corrosion resistance.

In an experiment, samples were left to stand in a high-temperature and high-humidity environment of 60° C. and 90% RH. After lapse of 1,000 hours, samples in which no corrosion was seen were evaluated as "good" and samples in which corrosion occurred were evaluated as "poor", thus showing the presence or absence of corrosion resistance. In Table 3, Sample No. 21 is a comparative FeN alloy, Sample No. 22 is an Fe-N-Al alloy, and Samples Nos. 23 to 47 are Fe-N-Al alloys to which Ti, Cr and so forth have been respectively added. Samples Nos. 22 to 47 are magnetic alloys according to the second embodiment of the present invention. Here, a content of Ti, Cr or the like which is less than 0.3 atom % can bring about no remarkable effect of corrosion resistance, and a content thereof which is more than 10 atom % may result in no formation of magnetic alloys having 15 kG or more of Bs. Thus, a magnetic alloy with superior magnetic characteristics and corrosion resistance can be obtained when at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb is contained in an amount of from 0.3 to 10 atom %.

In a third embodiment, the present invention is a magnetic alloy represented by the compositional formula:

$Fe_vN_wM_xK_y$ wherein M represents at least one of the elements belonging to Group IIIA of the periodic table; K represents at least one of the elements belonging to Group IVA of the periodic table; and v, w, x and y have the following relationship:

$1 \leq w \leq 10$
$0 < x < 10$
$0 < y < 10$
$0.5 \leq x + y \leq 10$
$v + w + x + y = 100$ in atom %, or a magnetic alloy represented by the compositional formula:

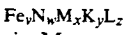

$Fe_vN_wM_xK_yL_z$ wherein M represents at least one of the elements belonging to Group IIIA of the periodic table; K represents at least one of the elements belonging to Group IVA of the periodic table; L represents at least one element selected from the group consisting of Ti, V, Cr, Co, Ni, Cu, Y, Zr, Nb, Mo, Ru, Rh, Pd, Ag, Sb, Hf, Ta, W, Re, Os, Ir, Pt and Au; and v, w, x, y and z have the following relationship:

$1 \leq w \leq 10$
$0 < x < 10$
$0 < y < 10$
$0.5 \leq x + y \leq 10$
$0.3 \leq z \leq 15$
$v + w + x + y + z = 100$ in atom %.

The magnetic alloy according to the third embodiment of the present invention can be prepared using the same apparatus as shown in FIG. 1 and in the same way as in the magnetic alloy according to the first embodiment of the present invention, except that a pair of targets 5 are alloy targets each composed of iron (Fe) and a combination of Al-Si or the like, or composite targets each comprised of a pure-iron target provided with an appropriate recession and a tip-shaped Al-Si or the like embedded in the recession.

Upon actuation of the apparatus, argon ions (Ar+) in the plasma 14 bombard the targets 5, and thus iron atoms and Al-Si or the like atoms in the targets 5 are broken away therefrom. Then, the iron atoms and Al-Si or the like atoms broken away from the targets 5 and the atoms or molecules of nitrogen in the plasma combine to deposit on the substrate 11 and grow into an alloy film.

The shutter 10 is similarly operated.

The flow rates of the nitrogen and argon are controlled by the flowmeters 1 and 2, respectively. The $27_vN_wM_xK_y$ alloy or $Fe_vN_wM_xK_yL_z$ alloy according to the third embodiment of the present invention, containing the nitrogen in a given quantity, can be thus obtained.

Table 4 shows the relationship between the content of nitrogen and Al-Si or the like in the $Fe_yN_wM_xK_y$ alloy thus obtained and the saturation magnetic flux density Bs and coercive force Hc thereof.

TABLE 4

| Sample No. | N (at %) | B (at %) | Al (at %) | Ga (at %) | C (at %) | Si (at %) | Ge (at %) | Fe | Bs (kG) | Hc (Oe) |
|---|---|---|---|---|---|---|---|---|---|---|
| 1 | 5.6 | — | — | — | — | — | — | bal. | 18.5 | 1.2 |
| 2 | — | — | 2.0 | — | — | — | — | bal. | 20.0 | 7.0 |
| 3 | 1.0 | — | 3.0 | — | — | — | 1.0 | bal. | 18.5 | 1.0 |
| 4 | 4.5 | — | 0.3 | — | — | 0.2 | — | bal. | 19 | 1.0 |
| 5 | 5.0 | 0.5 | 1.0 | — | 0.5 | — | — | bal. | 18.5 | 0.6 |
| 6 | 5.0 | — | 3.0 | — | — | 2.5 | — | bal. | 16.5 | 0.3 |
| 7 | 5.5 | — | — | 1.0— | — | 3.0 | — | bal. | 17 | 0.3 |
| 8 | 4.5 | 0.5 | — | 2.0— | 0.5 | — | 0.5 | bal. | 17.5 | 0.5 |

In Table 4, which shows the relationship between the content of nitrogen and Al-Si or the like and the saturation magnetic flux density Bs and coercive force Hc, the content is expressed in terms of atom % according to a quantitative analysis carried out by ESCA (X-ray electron spectroscopy for chemical analysis) or EPMA (X-ray electron probe microanalysis). Errors of about ±20% are estimated. The coercive force is expressed by a value obtained when a heat treatment is carried out in vacuum. The heat treatment is herein carried out at 300°C. Of these data, Sample No. 1 shows a result obtained when nitrogen only has been incorporated into Fe. Sample No. 2 shows a result obtained when Al only has been incorporated into Fe. Samples Nos. 3 to 8 are magnetic alloys according to the third embodiment of the present invention.

A nitrogen content of less than 1 atom % can bring about no remarkable effect attributable to nitrogen, resulting in little decrease of Hc. On the other hand, as already shown in FIG. 7, Bs becomes 15 kG or more when the nitrogen content is not more than 10 atom %. Thus, also in the present embodiment, a magnetic alloy with a high Bs and low Hc can be obtained when the nitrogen is contained in an amount of from 1 to 10 atom %.

Figure 8:
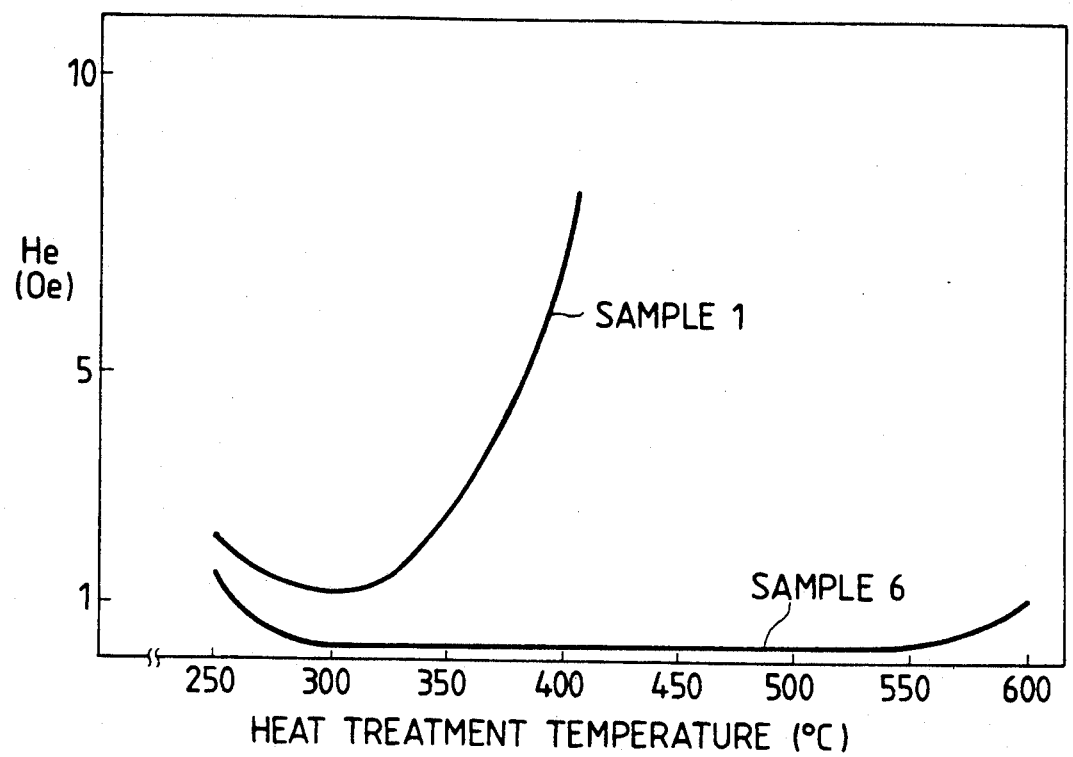

FIG. 8 shows changes of coercive force Hc depending on heat treatment temperatures in a magnetic alloy according to the third embodiment of the present invention and a conventional iron nitride (FeN) alloy. The FeN alloy has a relatively low Hc when the heat treatment temperature is 300° C. The Hc, however, abruptly increase when it is higher than 300° C. On the other hand, the magnetic alloy according to the third embodiment of the present invention is seen to have a low Hc and has a superior thermal stability. Here, a total content of Al-Si or the like which is less than 0.5 atom % can bring about no remarkable effect for achieving a low Hc and improving thermal stability, and a total content of Al-Si or the like which is more than 10 atom % may result in no formation of magnetic alloys having 15 kG or more of Bs. Thus, a magnetic alloy with a high Bs and low Hc can be obtained when the total content of Al-Si or the like is contained in an amount of from 0.5 to 10 atom %.

Figure 9:
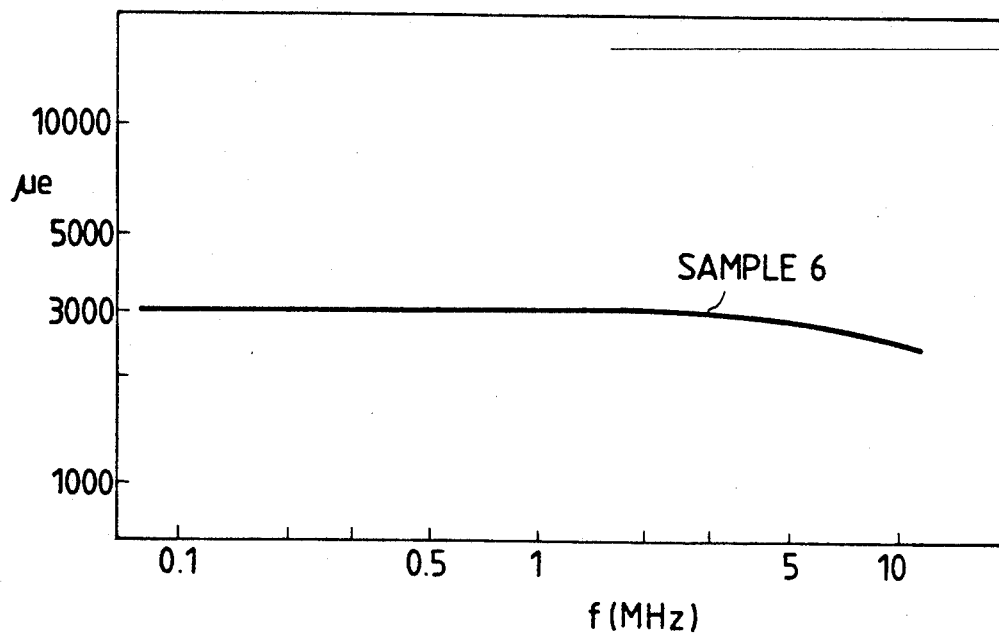

FIG. 9 shows a relationship between permeability $\mu$ and frequency of the magnetic alloy according to the third embodiment of the present invention, when the alloy is formed with a film thickness of 2 $\mu$m. The magnetic alloy according to the present embodiment is seen to have a permeability of as high as 3,000 and be achievable of sufficient reproducing efficiency when used as a magnetic head.

TABLE 5

| Sample No. | Element added | Amount (at %) | Corrosion resistance |
|---|---|---|---|
| 21 | — | — | poor |
| 22 | — | — | good |
| 23 | Ti | 0.3 | good |
| 24 | V | 3.0 | good |
| 25 | Cr | 0.3 | good |
| 26 | Co | 2.0 | good |
| 27 | Ni | 2.5 | good |
| 28 | Cu | 2.0 | good |
| 29 | Y | 3.0 | good |
| 30 | Zr | 3.0 | good |
| 31 | Nb | 2.5 | good |
| 32 | Mo | 0.5 | good |
| 33 | Ru | 1.0 | good |
| 34 | Rh | 1.0 | good |
| 35 | Pd | 3.0 | good |
| 36 | Ag | 3.0 | good |
| 37 | Sb | 2.0 | good |
| 38 | Hf | 3.0 | good |
| 39 | Ta | 3.0 | good |
| 40 | W | 1.0 | good |
| 41 | Re | 0.5 | good |
| 42 | Os | 2.0 | good |
| 43 | Ir | 2.0 | good |
| 44 | Pt | 3.0 | good |
| 45 | Au | 3.0 | good |

Table 5 shows that elements such as Ti and Cr contribute the improvement in corrosion resistance.

In an experiment, samples were left to stand in a high-temperature and high-humidity environment of 60° C. and 90% RH. After lapse of 1,000 hours, samples in which no corrosion was seen were evaluated as "good" and samples in which corrosion occurred were evaluated as "poor", thus showing the presence or absence of corrosion resistance. In Table 5, Sample No. 21 is a comparative FeN alloy, Sample No. 22 is an Fe-N-Al-Si alloy, and Samples Nos. 23 to 45 are Fe-N-Al-Si alloys to which Ti, Cr and so forth have been respectively added. Samples Nos. 22 to 45 are magnetic alloys according to the third embodiment of the present invention. Here, a content of Ti, Cr or the like which is less than 0.3 atom % can bring about no remarkable effect of corrosion resistance, and a content thereof which is more than 10 atom % may result in no formation of magnetic alloys having 15 kG or more of Bs. Thus, a magnetic alloy with superior magnetic characteristics and corrosion resistance can be obtained when at least one element selected from the group consisting of Ti, V, Cr, Co, Ni, Cu, Y, Zr, Nb, Mo, Ru, Rh, Pd, Ag, Sb, Hf, Ta, W, Re, Os, Ir, Pt and Au is contained in an amount of from 0.3 to 10 atom %.

In a fourth embodiment, the present invention is a magnetic alloy represented by the compositional formula:

$Fe_xN_yM_z$ wherein M represents C or Ge, or a mixture of C and Ge; and x, y and z have the following relationship:

$1 \leq y \leq 10$
$0.5 \leq z \leq 10$
$x+y+z=100$ in atom %, or a magnetic alloy represented by the compositional formula:

$Fe_xN_yM_zL_v$ wherein M represents C or Ge, or a mixture of C and Ge; L represents at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y, z and v have the following relationship:

$1 \leq y \leq 10$
$0.5 \leq z \leq 10$
$0.3 \leq v \leq 10$
$x+y+z+v=100$ in atom %.

The magnetic alloy according to the fourth embodiment of the present invention can be prepared using the same apparatus as shown in FIG. 1 and in the same way as in the magnetic alloy according to the first embodiment of the present invention, except that a pair of targets 5 are alloy targets each composed of iron (Fe) and C or Ge or the like, or composite targets each comprised of a pure iron target provided with an appropriate recession and a tip-shaped C or Ge or the like embedded in the recession.

Upon actuation of the apparatus, argon ions (Ar+) in the plasma 14 bombard the targets 5, and thus iron atoms and C or Ge or the like atoms in the targets 5 are broken away therefrom. Then, the iron atoms and C or Ge or the like atoms broken away from the targets 5 and the atoms or molecules of nitrogen in the plasma combine to deposit on the substrate 11 and grow into an alloy film.

The shutter 10 is similarly operated.

The flow rates of the nitrogen and argon are controlled by the flowmeters 1 and 2, respectively. The $Fe_xN_yM_z$ alloy or $Fe_xN_yM_zL_v$ alloy according to the fourth embodiment of the present invention, containing the nitrogen in a given quantity, can be thus obtained.

Table 6 shows the relationship between the content of nitrogen and C or Ge or the like in the $Fe_xN_yM_z$ alloy thus obtained and the saturation magnetic flux density Bs and coercive force Hc thereof.

TABLE 6

| Sample No. | N (at %) | C (at %) | Ge (at %) | Fe | Bs (KG) | Hc (Oe) |
| --- | --- | --- | --- | --- | --- | --- |
| 1 | 5.6 | — | — | bal. | 18.5 | 1.2 |
| 2 | — | 2.0 | — | bal. | 20.0 | 8.0 |
| 3 | 1.0 | 5.0 | — | bal. | 18 | 1.0 |
| 4 | 5.5 | 3.0 | — | bal. | 17.5 | 0.6 |
| 5 | 6.5 | 0.5 | — | bal. | 18 | 1.1 |
| 6 | 6.0 | — | 4.0 | bal. | 17 | 0.6 |
| 7 | 5.8 | 3.0 | 1.9 | bal. | 16 | 0.7 |

In Table 6, which shows the relationship between the content of nitrogen and C or Ge or the like and the saturation magnetic flux density Bs and coercive force Hc, the content is expressed in terms of atom % according to a quantitative analysis carried out by ESCA (X-ray electron spectroscopy for chemical analysis) or EPMA (X-ray electron probe microanalysis). Errors of about ±20% are estimated. The coercive force is expressed by a value obtained when a heat treatment is carried out in vacuum. The heat treatment is herein carried out at 300° C. Of these data, Sample No. 1 shows a result obtained when nitrogen only has been incorporated into Fe. Sample No. 2 shows a result obtained when C only has been incorporated into Fe. Samples Nos. 3 to 7 are magnetic alloys according to the fourth embodiment of the present invention.

A nitrogen content of less than 1 atom % can bring about no remarkable effect attributable to nitrogen, resulting in little decrease of Hc. On the other hand, as already shown in FIG. 7, Bs becomes 15 kG or more when the nitrogen content is not more than 10 atom %. Thus, also in the present embodiment, a magnetic alloy with a high Bs and low Hc can be obtained when the nitrogen is contained in an amount of from 1 to 10 atom %.

Figure 10:
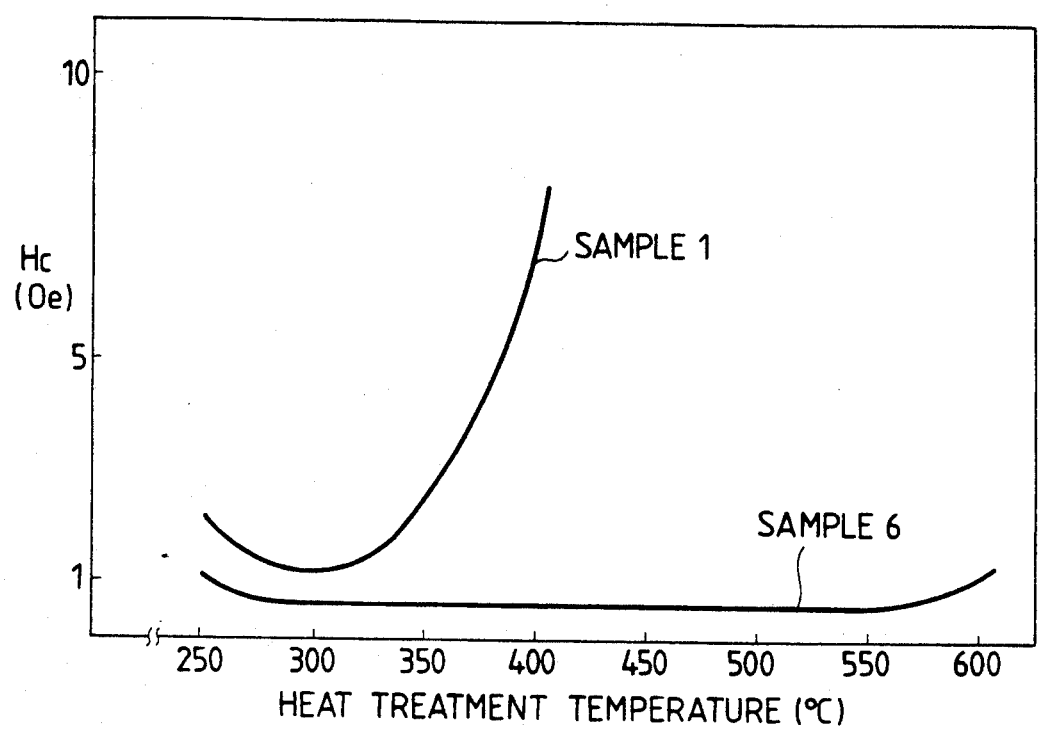

FIG. 10 shows changes of coercive force Hc depending on heat treatment temperatures in a magnetic alloy according to the fourth conventional iron nitride (FeN) alloy. The FeN alloy has a relatively low Hc when the heat treatment temperature is 300° C. The Hc, however, abruptly increases when it is higher than 300° C. On the other hand, the magnetic alloy according to the fourth embodiment of the present invention is seen to have a low Hc and has a superior thermal stability. Here, a content of C or Ge or a total content of C and Ge which is less than 0.5 atom % can bring about no remarkable effect for achieving a low Hc and improving thermal stability, and a content of C or Ge or a total content of C and Ge which is more than 10 atom % may result in no formation of magnetic alloys having 15 kG or more of Bs. Thus, a magnetic alloy with a high Bs and low Hc can be obtained when the content of C or Ge or the total content of C and Ge is contained in an amount of from 0.5 to 10 atom %.

Figure 11:
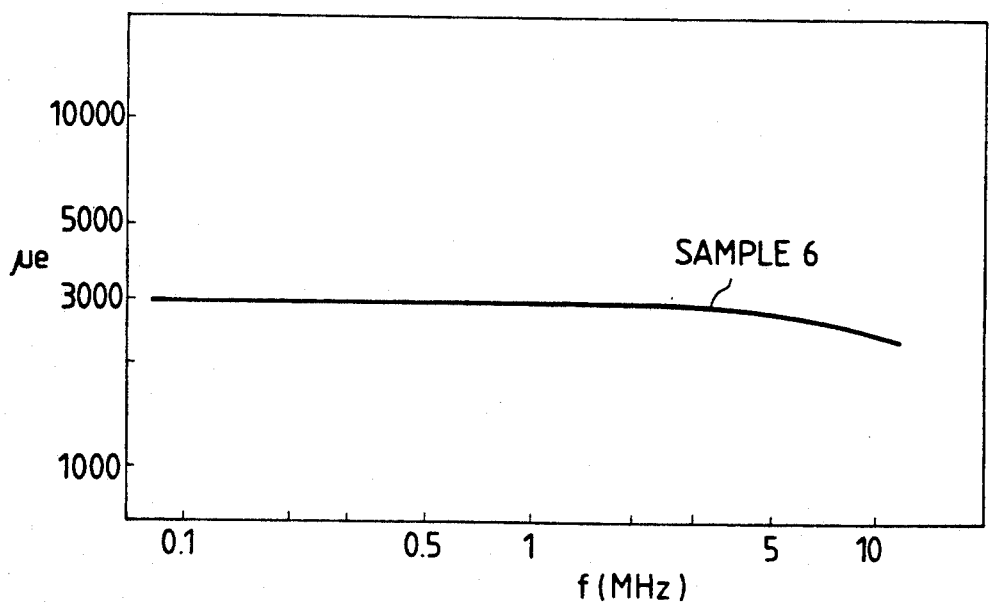

FIG. 11 shows a relationship between permeability μ and frequency of the magnetic alloy according to the fourth embodiment of the present invention, when the alloy is formed with a film thickness of 2 μm. The magnetic alloy according to the present embodiment is seen to have a permeability of as high as 3,000 and be achievable of sufficient reproducing efficiency when used as a magnetic head.

TABLE 7

| Sample No. | Element added | Amount (at %) | Corrosion resistance |
| --- | --- | --- | --- |
| 21 | — | — | poor |
| 23 | Ti | 0.3 | good |
| 24 | V | 3.0 | good |
| 25 | Cr | 0.3 | good |
| 26 | Co | 2.0 | good |
| 27 | Ni | 2.5 | good |
| 28 | Cu | 2.0 | good |
| 29 | Y | 3.0 | good |
| 30 | Zr | 3.0 | good |
| 31 | Nb | 2.5 | good |
| 32 | Mo | 0.5 | good |
| 33 | Ru | 1.0 | good |
| 34 | Rh | 1.0 | good |
| 35 | Pd | 3.0 | good |
| 36 | Ag | 3.0 | good |
| 37 | Sn | 2.0 | good |
| 38 | Sb | 2.0 | good |
| 39 | Hf | 3.0 | good |
| 40 | Ta | 3.0 | good |
| 41 | W | 1.0 | good |
| 42 | Re | 0.5 | good |
| 43 | Os | 2.0 | good |
| 44 | Ir | 2.0 | good |
| 45 | Pt | 3.0 | good |
| 46 | Au | 3.0 | good |

TABLE 7-continued

| Sample No. | Element added | Amount (at %) | Corrosion resistance |
|---|---|---|---|
| 47 | Pb | 2.0 | good |

Table 7 shows that elements such as Ti and Cr contribute the improvement in corrosion resistance.

In an experiment, samples were left to stand in a high-temperature and high-humidity environment of 60° C. and 90% RH. After lapse of 1,000 hours, samples in which no corrosion was seen were evaluated as "good" and samples in which corrosion occurred were evaluated as "poor", thus showing the presence or absence of corrosion resistance. In Table 7, Sample No. 21 is a comparative FeN alloy, and Samples Nos. 23 to 47 are Fe-N-C alloys to which Ti, Cr and so forth have been respectively added. Samples Nos. 23 to 47 are magnetic alloys according to the fourth embodiment of the present invention. Here, a content of Ti, Cr or the like which is less than 0.3 atom % can bring about no remarkable effect of corrosion resistance, and a content thereof which is more than 10 atom % may result in no formation of magnetic alloys having 15 kG or more of Bs. Thus, a magnetic alloy with superior magnetic characteristics and corrosion resistance can be obtained when at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb is contained in an amount of from 0.3 to 10 atom %.

In a fifth embodiment, the present invention is a magnetic alloy film represented by the compositional formula:

$$Fe_xN_yM_z$$

wherein M represents at least one elements selected from the group consisting of metals other than Fe, and semi-metals; and the plane of said film is oriented to have the (110) plane of α-Fe, or oriented to have the (110) plane of α-Fe and the (200) plane of γ'-Fe₄N and the relative intensity of X-ray diffraction for the (110) plane of α-Fe is greater than the relative intensity of X-ray diffraction for the (200) plane of γ'-Fe₄N. The letter symbols x, y and z may have the following relationship:

$1 \leq y \leq 10$
$0.5 \leq z \leq 10$
$x+y+z=100$;

In instances in which an Fe-N-M alloy film (M represents at least one elements selected from metals other than Fe, and semi-metals) is formed, its crystal structure and its plane of orientation become different depending on the conditions under which films are formed or the temperatures at which films are heat-treated. Magnetic characteristics also becomes different depending on such conditions and temperatures. Herein, in the case when the ratio of a relative diffraction intensity of a certain plane to a relative diffraction intensity of other plane is apparently greater than the ratio based on theoretical calculation, a film plane is regarded as being oriented to have that plane.

TABLE 8

| Sample No. | Composition of alloy (at %) | Heat treatment temp. (°C.) | Crystallite size (Å) | Hc (Oe) |
|---|---|---|---|---|
| 1 | Fe₉₉N₀.₅Si₀.₅ | 400 | 350 to 400 | 10 |
| 2 | Fe₈₈N₆Al₄Hf₂ | 500 | 110 | 0.3 |
| 3 | Fe₉₂N₆Si₂ | 450 | 70 to 150 | 0.3 |

TABLE 8-continued

| Sample No. | Composition of alloy (at %) | Heat treatment temp. (°C.) | Crystallite size (Å) | Hc (Oe) |
|---|---|---|---|---|
| 4 | Fe₉₁N₈Ge₁ | 400 | 250 to 300 | 0.5 |
| 5 | Fe₉₁N₈Ge₁ | 450 | 320 to 350 | 4 |
| 6 | Fe₉₂N₆Si₂ | 600 | 320 to 340 | 3 |

Table 8 shows characteristics of crystallite size and coercive force Hc in the case when the kind and amount of the M that represents at least one elements selected from metals other than Fe, and semi-metals are varied.

Figure 12:
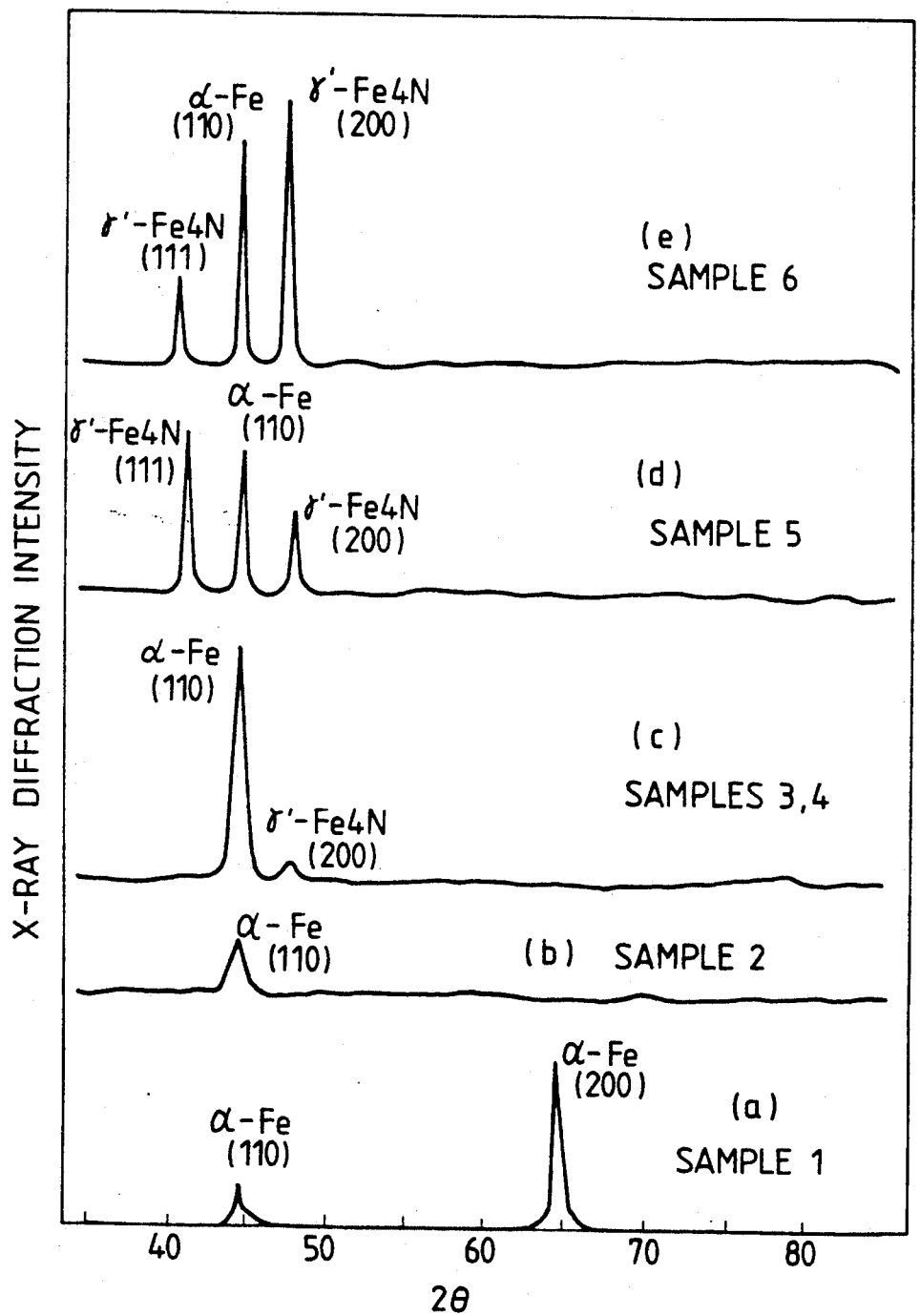
FIG. 12 is a graph showing X-ray diffration patterns for samples produced as in Table 1 and Table 8.

In FIG. 12, (a) shows an X-ray diffraction pattern of Sample 1 corresponding to the sample No. 1 having the composition as shown in Table 1. As will be apparent from this pattern, the film plane of Sample 1 is oriented to have the (200) plane of α-Fe. Here, the coercive force Hc is as high as 10 Oe.

On the other hand, (b) in FIG. 2 shows an X-ray diffraction pattern of a sample having the composition of Sample No. 2 as shown in Table 1. The film plane thereof is oriented to have the (110) plane of α-Fe. Here, the coercive force Hc is 0.3 Oe, showing that good magnetic characteristics are obtained.

In FIG. 12, (c) shows an X-ray diffraction pattern of a sample having the alloy composition of Fe₉₂N₆Si₂ and having been heat-treated at 450° C. (Sample No. 3) and a sample having the alloy composition of Fe₉₁N₈Ge₁ and having been heat-treated at 400° C. (Sample No. 4), as is seen from Table 8. The film plane of each of these samples is oriented to have the (110) plane of α-Fe, and besides has a diffraction peak at the (200) plane of γ'-Fe₄N.

In this (c), the relative diffraction intensity of the (200) plane of γ'-Fe₄N is very weak. Since, however, a theoretical calculation reveals that the relative diffraction intensity of the (111) plane of γ'-Fe₄N is greater than the relative diffraction intensity of the (200) plane of γ'-Fe₄N, it can be clearly said that the γ'-Fe₄N is oriented to the (200) plane.

In (d) of FIG. 12, showing an X-ray diffraction pattern of a sample having the alloy composition of the sample No. 5 as shown in Table 8, the α-Fe is oriented to the (110) plane, and the γ'-Fe₄N is oriented to the (111) plane. Here, the coercive force Hc is as high as 4 Oe as shown in Table 8.

In FIG. 12, (e) shows an X-ray diffraction pattern of a sample having the alloy composition of FE₉₂N₆Si₂ and having been heat-treated at 600° C. (Sample No. 6), as is seen from Table 8. The film plane of this sample is oriented to have the (110) plane of α-Fe and the (200) plane of γ'-Fe₄N, but the relative intensity of X-ray diffraction for the (200)plane of γ'-Fe₄N is greater than the relative intensity of X-ray diffraction for the (110) plane of α-Fe and also the crystallite size is larger. Here, the coercive force Hc is an high as 3 Oe.

As will be seen from Table 8, a magnetic alloy film with a sufficiently low Hc can be obtained when the alloy has a crystallite size of not more than 300 Å.

In the present embodiment also, as already shown in FIG. 7, Bs becomes 15 kG or more when the nitrogen content is not more than 10 atom %.

Similarly, a magnetic alloy with a high Bs can be obtained when M is contained in an amount of not more than 10 atom %. In this embodiment, M may be at least one elements selected from the group consisting of metals other than Fe, and semi-metals.

In the same way as, for example, the second embodiment of the present invention, an Fe-N-M alloy containing less than 0.5 atom % of M can not enjoy the effect attributable to the addition of M. Thermal stability can be improved when it contains not less than 0.5 atom % of M.

Thus, superior magnetic characteristics can be obtained when M is contained in an amount of from 0.5 to 10 atom %.

In the present embodiment also, a nitrogen content of less than 1 atom % can bring about no remarkable effect attributable to nitrogen, resulting in no orientation to the (110) plane of α-Fe.

What is claimed is:

1. A magnetic alloy film formed on a substrate and consisting essentially of the compositional formula:

$Fe_xN_yM_z$ wherein M is a mixture of Al, Ga and B; and x, y and z have the following relationship:
$1 \leq y \leq 10$
$0.5 \leq z \leq 10$
$x+y+z=100$
in atom %, and wherein the plane of the film is oriented to have the (110) of α-Fe and the (200) plane of γ'-Fe$_4$N, and the relative intensity of the X-ray diffraction for the (110) plane of α-Fe is greater than the relative intensity of the X-ray diffraction for the (200) plane of γ'-Fe$_4$N.

2. A magnetic alloy film formed on a substrate and consisting essentially of the compositional formula:

$Fe_xN_yGa_zL_v$ wherein L represents at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y, z and v have the following relationship:
$1 \leq y \leq 10$
$0.5 \leq z \leq 10$
$0.3 \leq v \leq 10$
$x+y+z+v=100$
in atom %, and wherein the plane of the film is oriented to have the (110) of α-Fe and the (200) plane of γ'-Fe$_4$N, and the relative intensity of the X-ray diffraction for the (110) plane of α-Fe is greater than the relative intensity of the X-ray diffraction for the (200) plane of γ'-Fe$_4$N.

3. A magnetic alloy film formed on a substrate and consisting essentially of the compositional formula:

$Fe_vN_wM_xC_y$ wherein M is a mixture of B and Al; and v, w, x and y have the following relationship:
$1 \leq w \leq 10$
$0 < x < 10$
$0 < y < 10$
$0.5 \leq x+y \leq 10$
$v+w+x+y=100$
in atom %, and wherein the plane of the film is oriented to have the (110) plane of α-Fe and the (200) plane of γ'-Fe$_4$N, and the relative intensity of the X-ray diffraction for the (100) plane of α-Fe is greater than the relative intensity of the X-ray diffraction for the (200) plane of γ'-Fe$_4$N.

4. A magnetic alloy film formed on a substrate and consisting essentially of the compositional formula:

$Fe_vN_wM_xK_y$ wherein M is a mixture of B and Ga; K is a mixture of C and Ge; and v, w, x and y have the following relationship:
$1 \leq w \leq 10$
$0 < x < 10$
$0 < y < 10$
$0.5 \leq x+y \leq 10$
$v+w+x+y=100$
in atom %, and wherein the plane of the film is oriented to have the (110) plane of α-Fe and the (200) plane of γ'-Fe$_4$N, and the relative intensity of the X-ray diffraction for the (110) plane of α-Fe is greater than the relative intensity of the X-ray diffraction for the (200) plane of γ'-Fe$_4$N.

5. A magnetic alloy formed on a substrate and consisting essentially of the compositional formula:

$Fe_xN_yC_zL_v$ wherein L represents at least one element selected from the group consisting of Ti, V, Cr, Co, Ni, Cu, Y, Zr, Nb, Mo, Ru, Rh, Pd, Ag, Sn, Sb, Hf, Ta, W, Re, Os, Ir, Pt, Au and Pb; and x, y, z and v have the following relationship:
$1 \leq y \leq 10$
$0.5 \leq z \leq 10$
$0.3 \leq v \leq 10$
$x+y+z+v=100$
in atom %, and wherein the plane of the film is oriented to have the (110) plane of α-Fe and the (200) plane of γ'-Fe$_4$N, and the relative intensity of the X-ray diffraction for the (110) plane of α-Fe is greater than the relative intensity of the X-ray diffraction for the (200) plane of γ'-Fe$_4$N.

* * * * *